Figure 1:
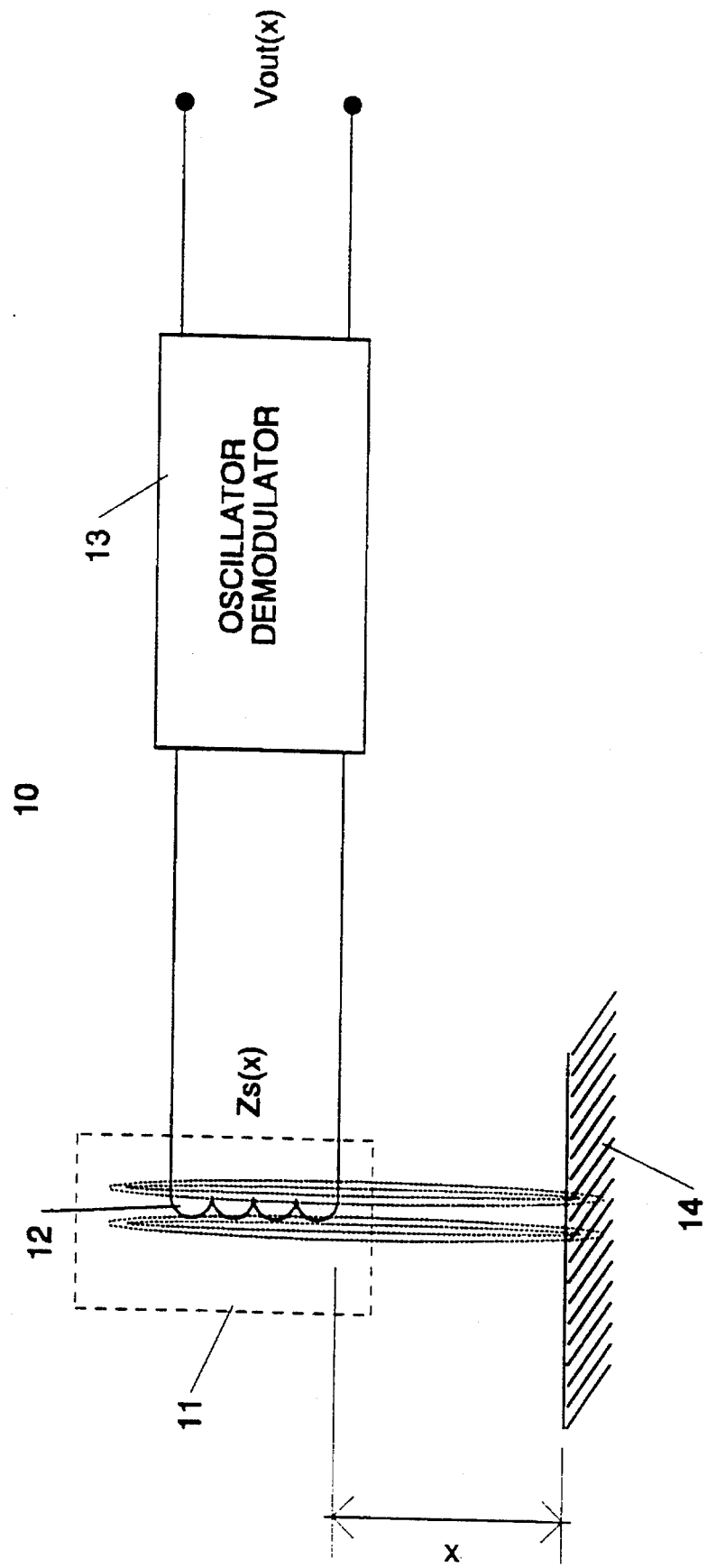

United States Patent [19]

Larsen et al.

[11] Patent Number: 5,525,900
[45] Date of Patent: Jun. 11, 1996

[54] METHOD FOR DETERMINING THE DISPLACEMENT OF AN OBJECT OF AN ELECTRICALLY CONDUCTING MATERIAL

[75] Inventors: Gunner H. Larsen, Kokkedal; Henrik B. Jensen, Vedbaek, both of Denmark

[73] Assignee: A/S Bruel & Kjaer, Naerum, Denmark

[21] Appl. No.: 256,678

[22] PCT Filed: Jun. 21, 1994

[86] PCT No.: PCT/DK94/00248

§ 371 Date: Jul. 20, 1994

§ 102(e) Date: Jul. 20, 1994

[87] PCT Pub. No.: WO95/00818

PCT Pub. Date: Jan. 5, 1995

[30] Foreign Application Priority Data

Jun. 25, 1993 [DK] Denmark .................... 762/93

[51] Int. Cl.$^6$ .................. G01B 7/14; G06G 7/28
[52] U.S. Cl. ............... 324/207.12; 324/207.16; 324/207.19; 324/233; 364/573
[58] Field of Search ........... 324/207.12, 207.16–207.19, 324/207.26, 225, 229–231, 233; 364/561–563, 573

[56] References Cited

U.S. PATENT DOCUMENTS

| | | | |
|---|---|---|---|
| 3,586,964 | 6/1971 | Strouch | 324/34 |
| 3,636,338 | 1/1972 | Abnett et al. | 235/197 |
| 4,095,469 | 6/1978 | Yamada et al. | 324/225 X |
| 4,837,510 | 6/1989 | Tornblom | 324/22.5 |
| 4,864,235 | 9/1989 | Tornblom | 324/22.5 X |
| 4,875,007 | 10/1989 | Ginns | 324/207 |
| 4,950,987 | 8/1990 | Vranish et al. | 324/207.15 X |
| 5,003,262 | 3/1991 | Egner et al. | 324/225 X |
| 5,027,066 | 6/1991 | Reder | 324/207.16 |
| 5,130,651 | 7/1992 | Morrey, Jr. | 324/225 |

FOREIGN PATENT DOCUMENTS

| | | | |
|---|---|---|---|
| 151409B | 11/1987 | Denmark | G01D 5/20 |
| 473899 | 12/1975 | U.S.S.R. | G01D 5/20 |
| 1223129A1 | 4/1986 | U.S.S.R. | G01N 27/90 |
| 1518661A1 | 1/1993 | U.S.S.R. | G01B 7/00 |
| WO88/06268 | 8/1988 | WIPO | G01B 7/00 |

OTHER PUBLICATIONS

"Image of a Coil in Relation to the Gauging of Distance of Metal Surfaces"; Electronics Letters; Oct. 3, 1974; vol. 10; No. 20; pp. 409–410.

"Principles of Eddy–Current Distance Gauges"; Prof. H. Sutcliffe; Proc. IEE. vol. 124, No. 5; May 1977; pp. 479–484.

Primary Examiner—Gerard R. Strecker
Attorney, Agent, or Firm—Fish & Richardson

[57] ABSTRACT

A method for determining a displacement of an object of an electrically conductive material. The method includes the step of using a transducer to establish an electromagnetic field for creating eddy currents in the object. This results in a first electrical signal representing the impedance of the transducer; the direction and magnitude of the electrical signal are represented by a first vector having first and second components. The first component is a second vector dependent on the characteristics of the transducer and on the distance between the transducer and the object. The second component depends on the characteristics of the transducer, the distance between the transducer and the object, and the object's characteristics (e.g., the electrical conductivity, permeability, and temperature). The first electrical signal represented by the first vector is then processed to generate a second electrical signal corresponding to a separate vector. This vector is independent of the characteristics of the object being measured, and is a function of the distance between the coil and the object.

35 Claims, 13 Drawing Sheets

METHOD FOR DETERMINING THE DISPLACEMENT OF AN OBJECT OF AN ELECTRICALLY CONDUCTING MATERIAL

The present invention relates to a method and an apparatus for determining the displacement of an object of an electrically conducting material.

When measuring displacement with eddy current proximity probes or transducers, the precision of the transducers is limited by their sensitivity to changes within three essential parameters of the object to be measured, which are conductivity, permeability and temperature. The changes in conductivity and/or permeability may be due to the material of the measured object being non-homogenous and/or due to changes in the temperature. Usually, displacement transducers are calibrated for a certain material, and if this material is non-homogenous the measured displacement value will be erroneous.

In the article "Principles of eddy-current distance gauges", Prof. H. Sutcliffe, PROC. IEE, Vol. 124, No 5, May 1977, the field theory of an a.c. loop over a metal surface is reviewed and expressions are derived which demonstrates the possibility of a method of distance gauging in which the effect of conductivity and permeability of the metal can be compensated. In the method of Sutcliffe, a high frequency primary current I is supplied to a probe coil and it is discussed that the measured electromagnetic field V can be divided into three components, $V_1$, $V_2$ and $\Delta V$. $V_1$ is the voltage that would be induced by the primary current I in the absence of the metal, where $V_1$ leads I by 90°, $V_2$ is the voltage that would be induced by an ideal mirror image of the probe coil and lags I by 90°, and the third component of the voltage $\Delta V$ is a function of the conductivity and the permeability of the metal besides being a function of different parameters of the probe. It is however concluded that over a wide range of conditions $\Delta V$ leads I by a phase angle of 45°. Thus a distance gauge system is proposed by Sutcliffe in which the effect of $\Delta V$ is compensated for by introducing a load impedance with a −45° phase angle, and thus compensating for the effect of conductivity and permeability of the metal.

However, the assumption of the 45° phase angle is only valid for restricted values of operating parameters and the system proposed by Sutcliffe does not provide a general solution to the problem of compensating for changes in the condutivity and the permeability of the object of measurement when measuring displacement of an object of an electrically conducting material. Furthermore, it is to be noted that the system proposed by Sutcliffe is not suitable for use in connection with objects of measurement having a coating of an electrical conducting material.

An example of an eddy current transducer for measurement of material thickness is disclosed in SU-A-1223129. This patent discloses a transducer in which changes of electroconductivity of the measured object are compensated for by the use of a compensation winding which is set at a distance from the operating surface.

An eddy current proximity detection system is disclosed in U.S. Pat. No. 4,875,007. This patent discloses a detection system in which the effects of changes in temperature are reduced. To compensate for a decrease in probe sensitivity with temperature, a temperature sensitive element is included in a network which controls the amplitude of an oscillator, which is alternately feeding two matched probes, one a measurement and the other a reference probe. In this system the probes are operated in a resonant mode to increase both the system linearity and sensitivity.

It is an object of the present invention to provide a method and a system for determining the displacement of an object of an electrically conducting material wherein the effects of variations in the parameters of the material such as conductivity and permeability may be compensated for.

Another object of the present invention is to provide a transducer system in which the effects of changes in temperature are reduced.

A further object of the invention is to provide a system for linearization of electric signals.

Thus, the present invention provides a method for determining the displacement of an object of an electrically conducting material and comprising establishing, by means of a transducer having transducer terminals and being placed adjacent to and spaced from the object, an electromagnetic field creating eddy currents in the object, providing a first electrical signal which represents the impedance of the transducer and which may be represented by a first vector having first and second components, the first component being a second vector dependent on characteristics of the transducer and on the distance between the transducer and the object, and the second component being a product of a first factor which is a real number and a second factor which is a third vector, the first factor depending on characteristics of the transducer, the distance between the transducer and the object, and characteristics of the object, the third vector depending substantially on characteristics of the transducer, and processing the first electrical signal, said processing including simulating projection of the first vector onto an axis being generally at right angles to the second component so as to substantially eliminate the dependency on the characteristics of the object.

It should be understood that in order to eliminate the dependency on the characteristics of the object when measuring the displacement of the object with reference to the transducer according to the method of the invention, it is necessary to know the direction of the second component of the first vector in order to perform the desired projection of the first vector. It should also be understood that the direction of the second component or the third vector is a function of the characteristics of the transducer, i.e. different transducer configurations will result in different directions of projection. In a preferred method according to the invention the direction of the second component is found by a graphical or numeric optimization of a plurality of curves representing values of the first electrical signal as a function of the distance between the transducer and the object, the plurality of curves representing a plurality of conducting materials of the object.

In order to perform the projection of the first vector it is preferred to make use of the obtained direction of the second component in the generation of a second electrical signal corresponding to a fourth vector being at substantially right angles to the second component which second electrical signal represents the axis of projection, and multiplying or dividing the first electrical signal with the generated second electrical signal. Thus, a third electrical signal may be obtained carrying information which represents the result of the projection, this information being a function of the angle between the first vector and the fourth vector corresponding to the phase difference between the first and the second electrical signals.

When multiplying the first electrical signal with the second electrical signal the resulting third electrical signal may have an ac and a dc component with the dc component carrying the information of the result of the projection. Thus, in order to obtain the information of the dc component it is further preferred to filter the result of the multiplication or division, the filtering preferably being a low-pass filtering.

When determining the displacement of an object according to the above described methods the result is most likely to be a non-linear function of the distance between the transducer and the object due to non-linearities in the transducer and the electronic components which provide and process the electrical signals. However, this non-linearity may be compensated for by linearizing the result of the filtering.

In a preferred embodiment according to the invention an input current is generated from an oscillator output voltage, the input current having a substantially constant amplitude and frequency and a phase substantially equal to the phase of the oscillator output voltage and being supplied to the transducer. It is also preferred that the oscillator output voltage has a constant amplitude and frequency.

When supplying a current to the transducer a voltage will develop across the transducer due to the impedance of the transducer. Thus, the first electrical signal may be the voltage across a pair of terminals of the transducer.

The oscillator output voltage may also be used in order to generate the second electrical signal by providing the oscillator output voltage with a phase shift. Preferably, the angle of the phase shift equals the angle between the oscillator output voltage and a vector being at substantially right angles to the second component of the first electrical signal.

In order to reduce the effects of temperature variations it is preferred that the transducer comprises a coiled wire made from a material having a conductivity and other electrical characteristics which is temperature dependent to a small degree only. Furthermore, it is also preferred that the transducer is self-compensating and comprises a pair of coils and a pair of impedances being part of a bridge network. The pair of coils may be arranged around a pair of separate cores but they may also be arranged around a common core. It is preferred that the cores are produced from a magnetic material but the cores may also be produced from a non-magnetic material.

In order to obtain the self-compensating transducer it has been found that it is most convenient if an electric value of the coils differ slightly, said electric value of at least one of the coils being adjusted by adjustment means so as to obtain substantially the same electric value for said pair of coils. Preferably the adjustment means comprises an adjustment member which is made from an electrically conducting material and/or a magnetizable material and which is moveable in relation to the coils.

When linearizing the result of the filtering, this result may be expressed as a polynomial function of the distance between the transducer and the object of measurement where the polynomial function may be obtained by the method of least squares. Thus, the linearization may comprise approximating the result of the filtering to a first polynomial function with positive integral exponents of at least an order of four. This first polynomial function may be used in a feed back loop of a circuit comprising an amplifier.

However, in another preferred embodiment according to the invention the linearization comprises approximating the result of the filtering to a second polynomial function with positive broken exponents of at least an order of two or at least an order of three. This second polynomial function may be used in a feed back loop of a circuit comprising an amplifier. It is furthermore preferred that the second polynomial function is generated by use of transistors which may be integrated on a common substrate of an integrated circuit. These transistors may be used in order to obtain an electrical implementation of logarithmic and antilogarithmic units for use in the generation of the above mentioned polynomial functions.

The invention also relates to a transducer system or an apparatus for determining a displacement of an object of an electrically conductive material, said apparatus comprising a transducer for establishing an electromagnetic field creating eddy currents in the object when the transducer is placed adjacent to and spaced from the object, said transducer having transducer terminals, means for generating a first electrical signal which represents the impedance of the transducer and which signal may be represented by a first vector having first and second components, the first component being a second vector dependent on characteristics of the transducer and on the distance between the transducer and the object, and the second component being a product of a first factor which is a real number and a second factor which is a third vector, the first factor depending on characteristics of the transducer, the distance between the transducer and the object, and characteristics of the object, the third vector depending substantially on characteristics of the transducer, and means for processing the first electrical signal, said processing including simulating projection of the first vector onto an axis being generally at right angles to the second component so as to substantially eliminate the dependency on the characteristics of the object.

In order to simulate projection of the first vector onto an axis being generally at right angles to the second component the direction of the second component may be determined by a method according to the invention as described above. However, any other method which will provide the required information concerning the direction of the second component may be used. The information concerning the direction of the second component may be stored in the processing means and in a preferred embodiment of the transducer system or apparatus the processing means further comprises means for generating a second electrical signal corresponding to a fourth vector being at substantially right angles to the second component which second electrical signal represents the axis of projection, and means for multiplying or dividing the first electrical signal with the generated second electrical signal.

A third electrical signal may be the output of the multiplying or dividing means and this third electrical signal may be represented as a sum of ac and dc component(s) where the dc component(s) contain(s) information which is sufficient to represent the result of the simulated projection. Thus, in order to obtain a result representing data being representative of the projection the third electrical signal may be filtered, and it is preferred that the transducer system or apparatus further comprises means for filtering the output of the multiplication or division means, the filtering means preferably being means for low-pass filtering.

As mentioned above the output of the filtering means is most likely to be non-linear and preferably the transducer system or apparatus further comprises means for linearizing the output of the filtering means.

In a preferred embodiment of the transducer system or apparatus the means for generating the first electrical signal further comprises oscillator means for generating an oscillator output voltage, means for generating an input current to the transducer, said input current having a substantially constant amplitude and frequency and a phase substantially equal to the phase of the oscillator output voltage. Furthermore, it is preferred that the oscillator means is capable of generating an output voltage of a substantially constant frequency, which frequency preferably is in the range of 0.1–10 MHz, and more preferably being 1 MHz. However, it should be understood that the frequency is not restricted to the above mentioned range of 0.1–10 MHz.

It is also preferred that the transducer system or apparatus further comprises amplification means, which may be part of the processing means, for amplifying the first electrical signal, said first electrical signal preferably being the voltage across the transducer terminals.

The information concerning the direction of the second component may be given as an angle between the oscillator output voltage vector and a vector being at substantially right angles to the second component of the first electrical signal, and in a preferred embodiment of the transducer system or apparatus the processing means for generating the second electrical signal further comprise phase shifting means for providing the oscillator output voltage with a phase shift and thereby obtaining the second electrical signal, said phase shifting means preferably providing a phase shifting angle being equal to the angle between the oscillator output voltage and a vector being at substantially right angles to the second component of the first electrical signal.

It is to be understood that the effects of temperature changes of the object of measurement are substantially eliminated by use of the above system or apparatus. However, the effects of temperature changes of the transducer itself should also be minimized in order to perform a generally temperature independent measurement of displacement. Thus, the invention also relates to a transducer which may be used in the above transducer system or apparatus. This transducer may comprise a coil or coils, which is or are preferably made of a material having small variations in material parameters as a function of temperature. Preferably, the transducer is a self-compensating transducer comprising input and output current terminals, a pair of generally similar coils, a measurement coil and a reference coil, a pair of impedances having substantially the same values, the two coils and the two impedances forming part of a balanced circuit, with a pair of output voltage terminals being formed at the two balancing points of the balanced circuit. Furthermore, it is preferred that the transducer comprises two cores or a common core for winding of the two coils and an adjustment core for balancing the balanced circuit, the two cores or the common core preferably having recesses of different length wherein the two coils are arranged.

In a preferred embodiment of the apparatus the linearization means comprises means for approximating the output of the filtering means to a first polynomial function with positive integral exponents of at least an order of four, and circuit means comprising a feed back loop and using the first polynomial function in the feed back loop.

The invention furthermore relates to a linearization unit for linearization of an electrical signal, which unit may be used in the transducer system or apparatus according to the invention and said linearization unit comprising means for approximating an input signal to a polynomial function with positive broken exponents of at least an order of two or preferably three. Preferably, the linearization unit also comprises circuit means having a feed back loop and using the polynomial function in the feed back loop. In a preferred embodiment of said linearization unit the approximating means comprises an integrated circuit with at least three and preferably four transistors on a common substrate, said transistors being used for generating the polynomial function with broken exponents.

Figure 2:
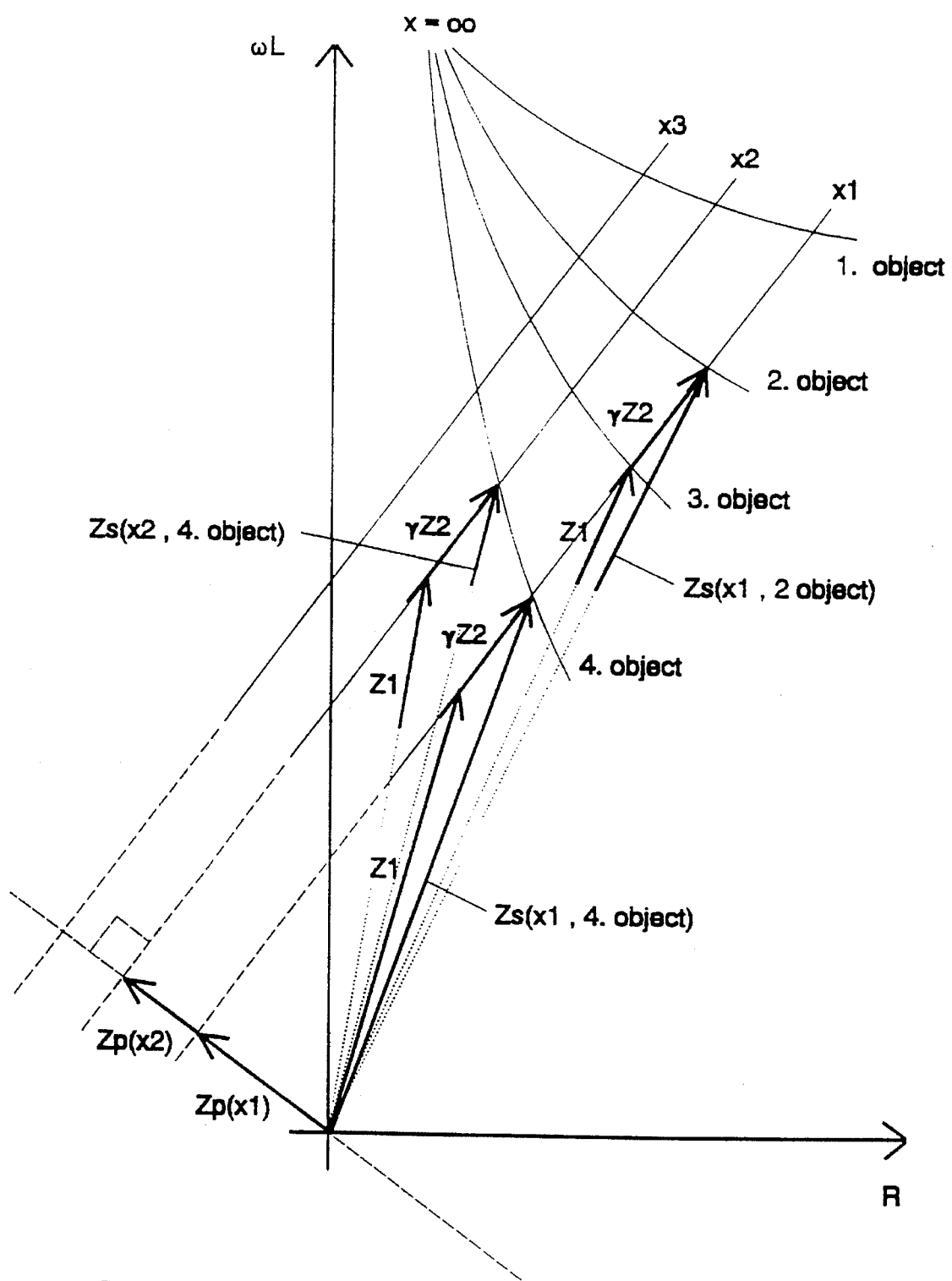
Figure 3:
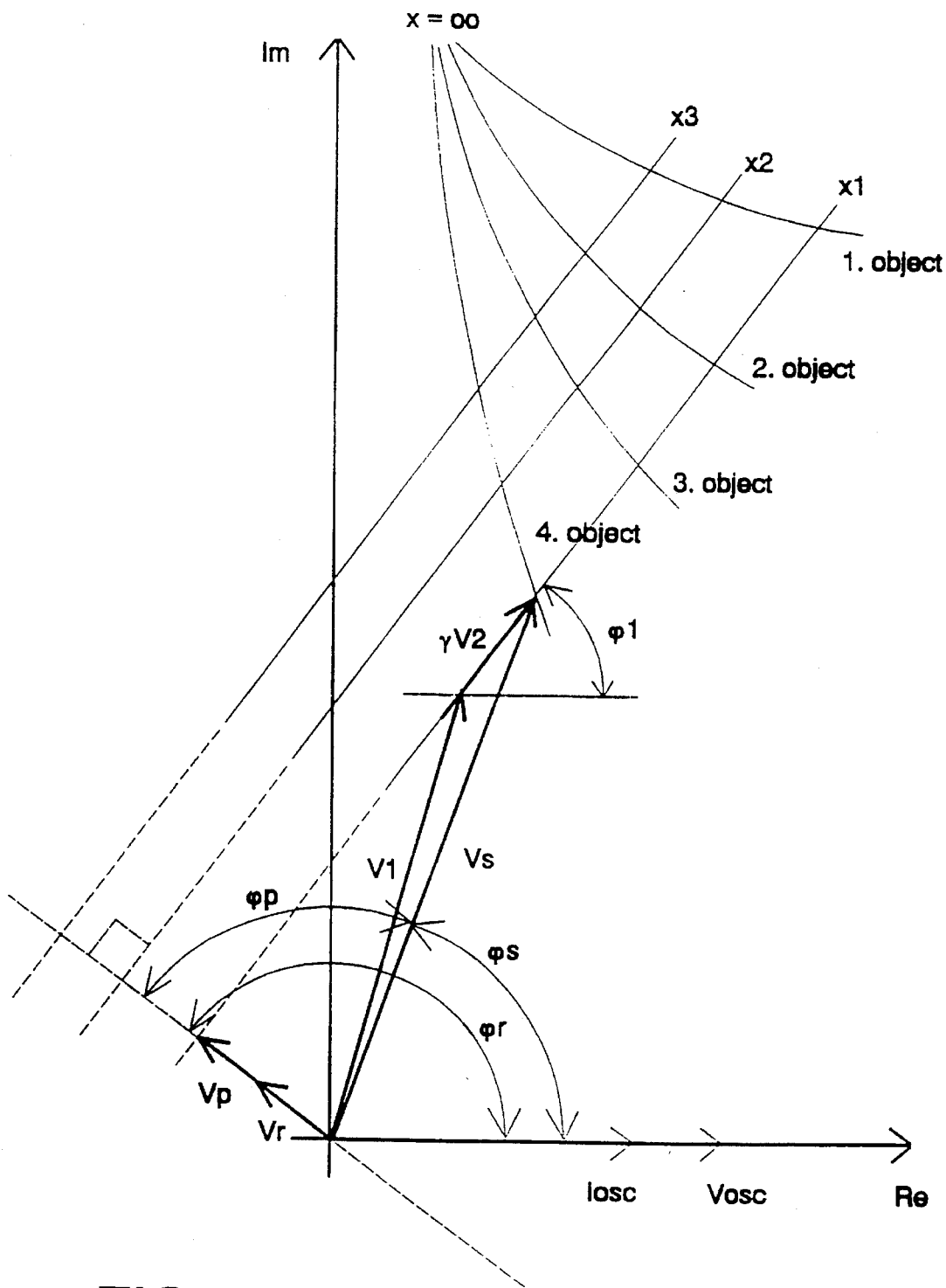
Figure 4:
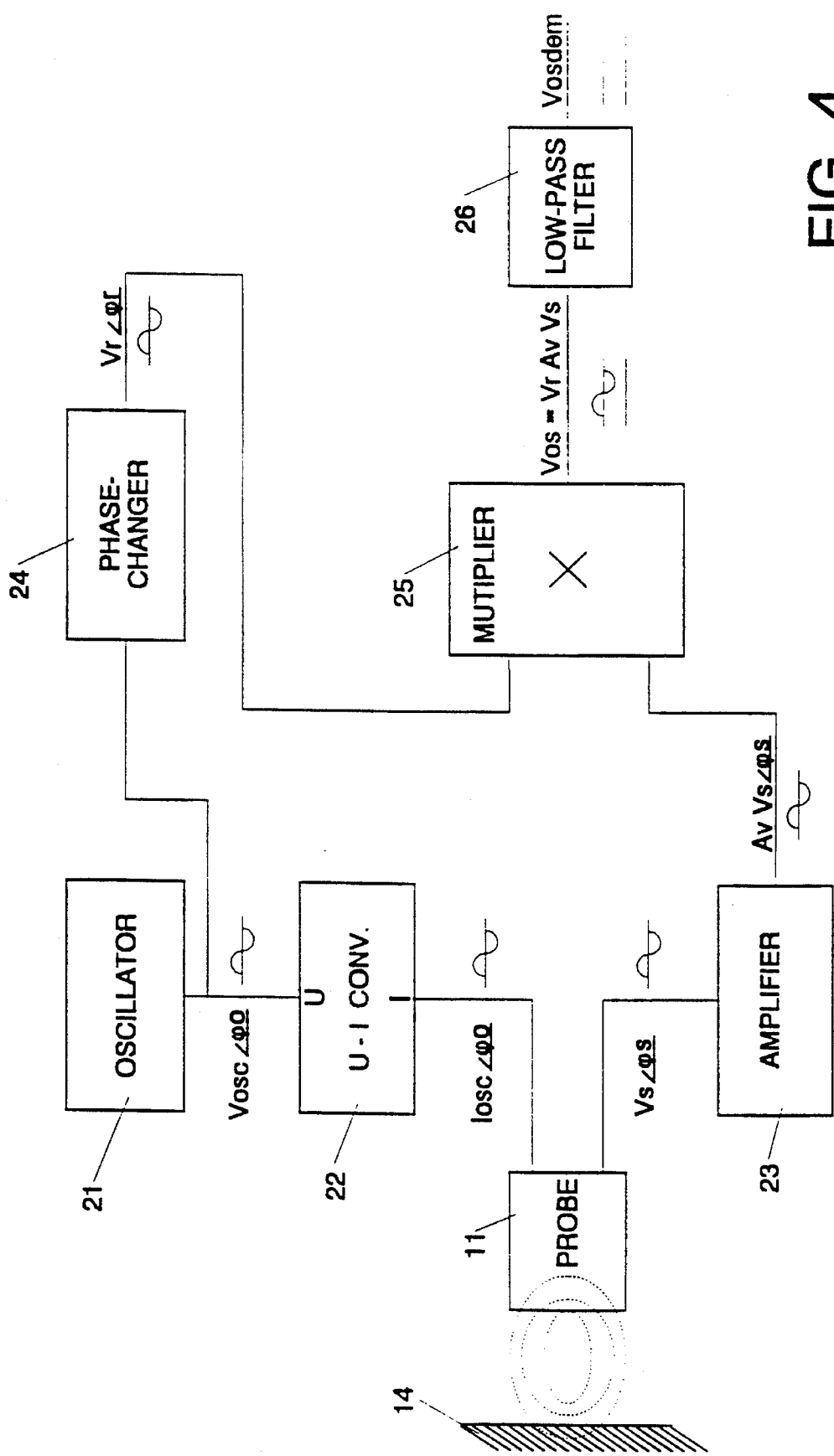
Figure 5:
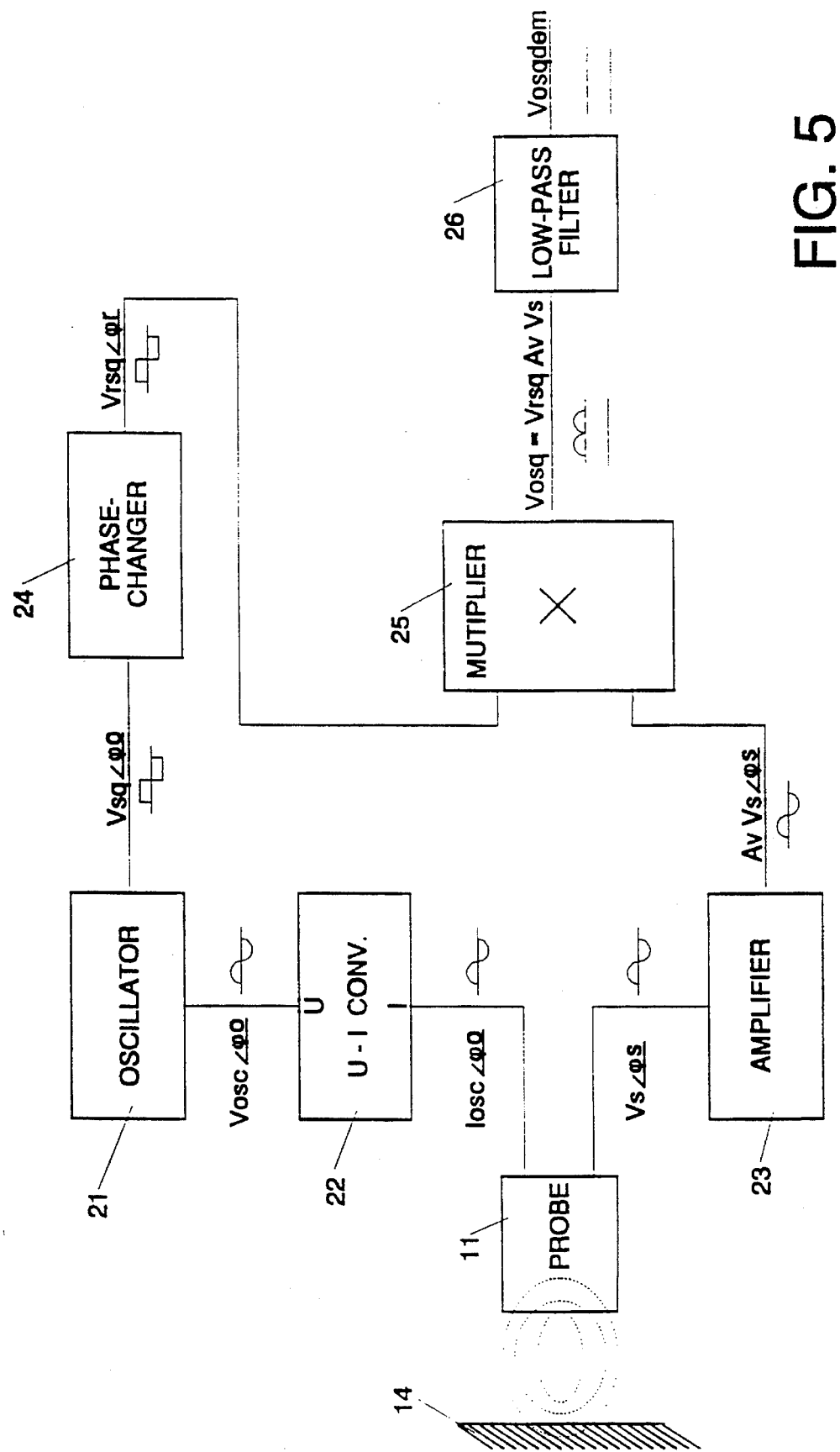
Figure 6:
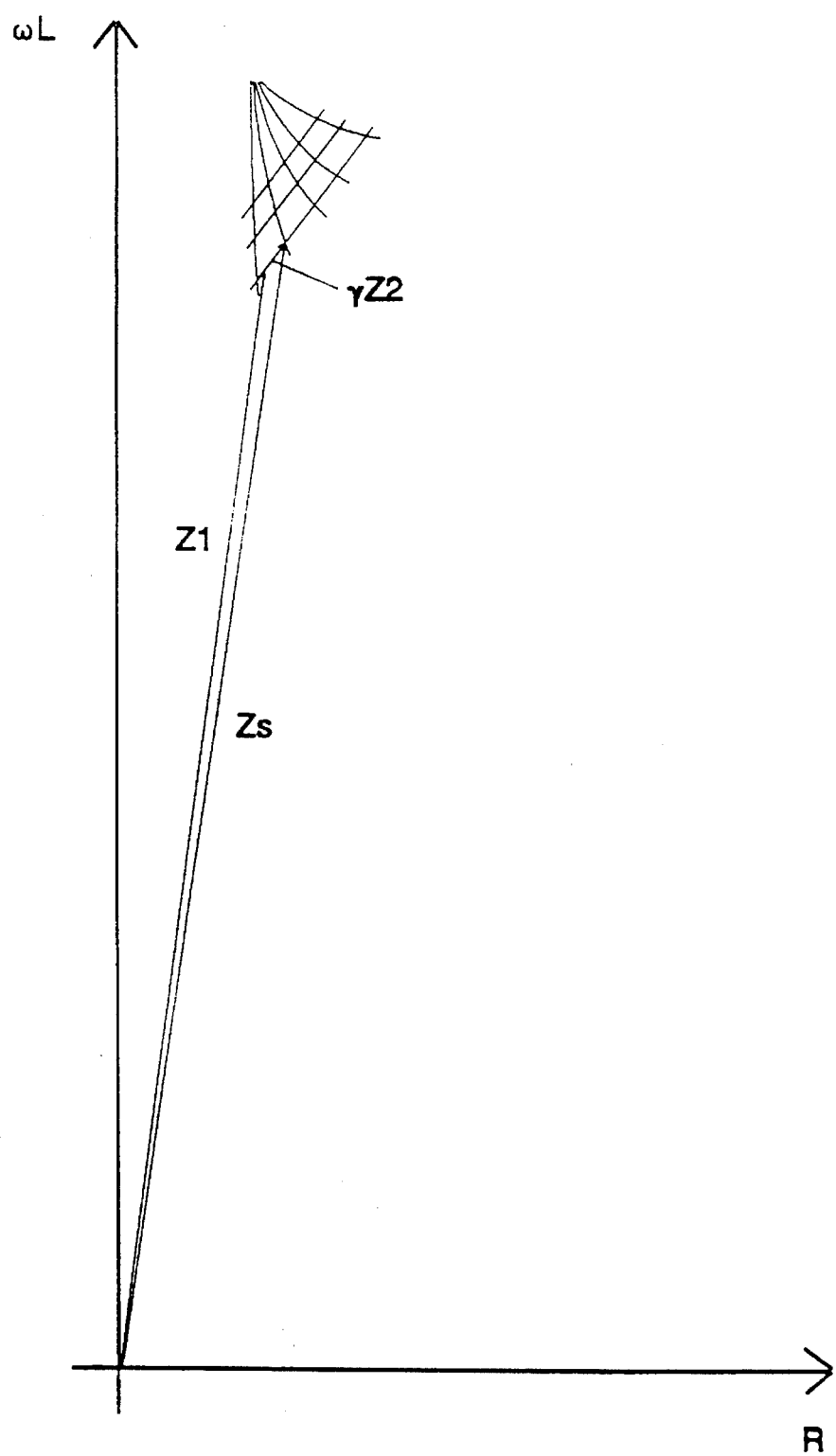
Figure 7:
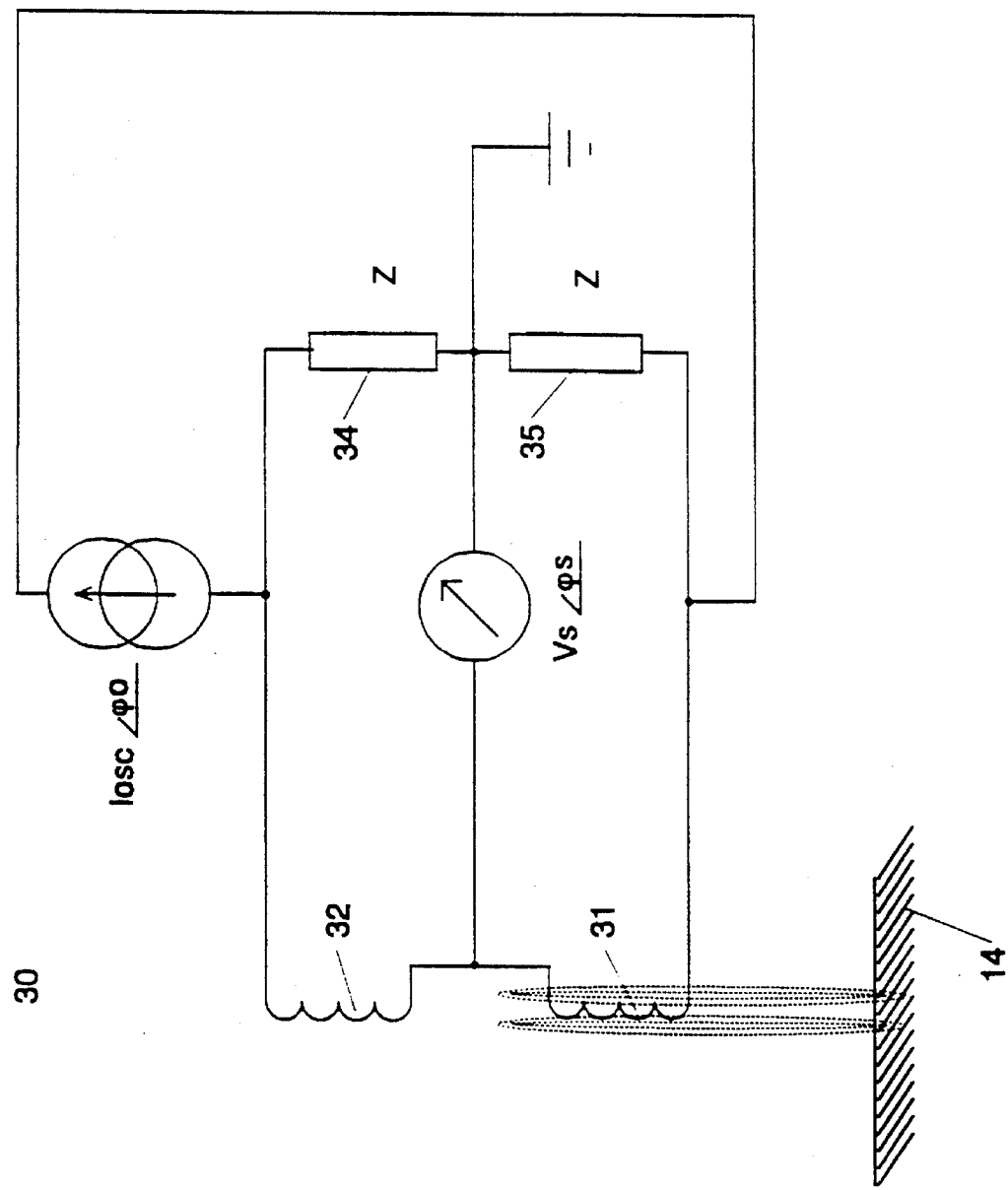
Figure 8:
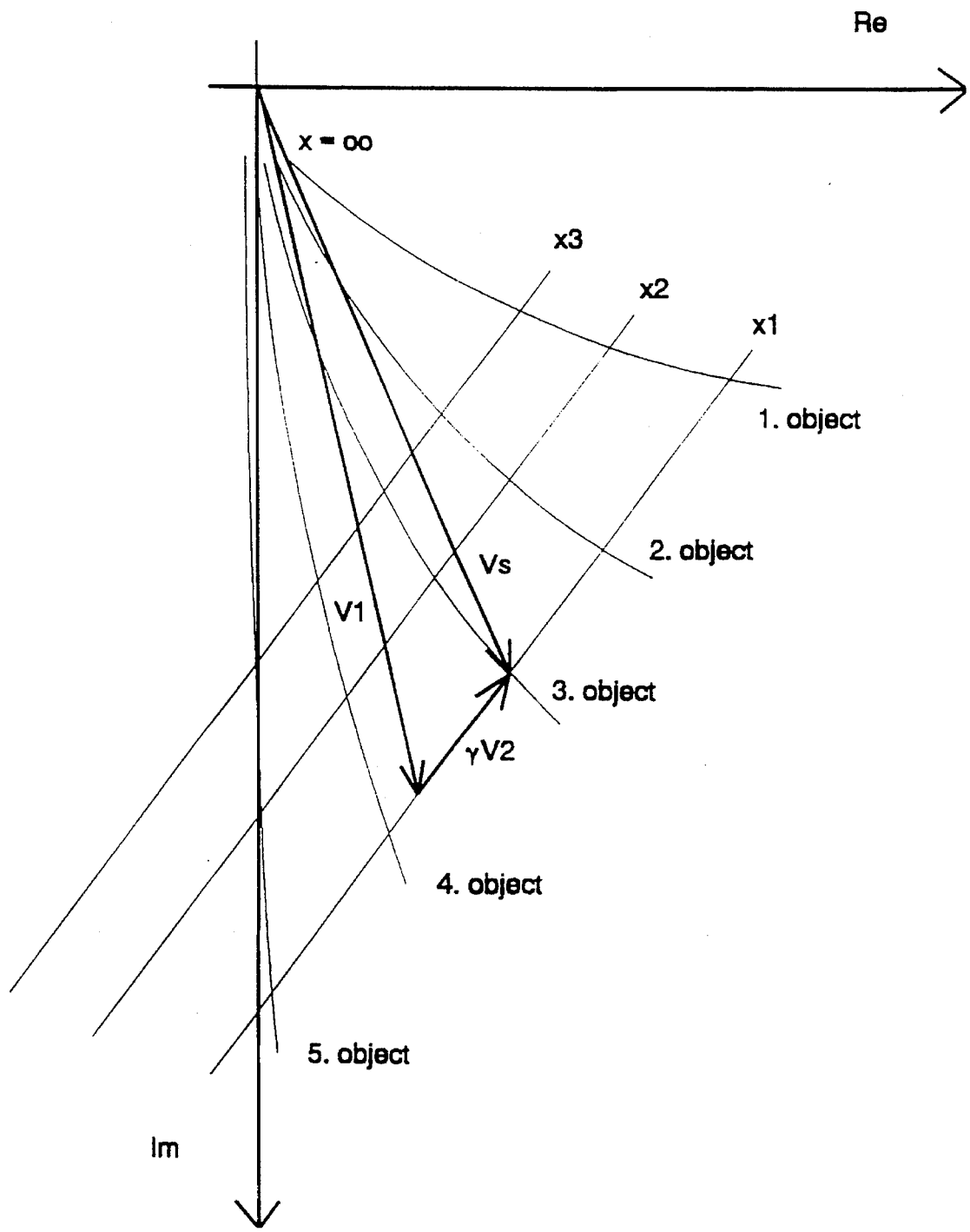
Figure 9:
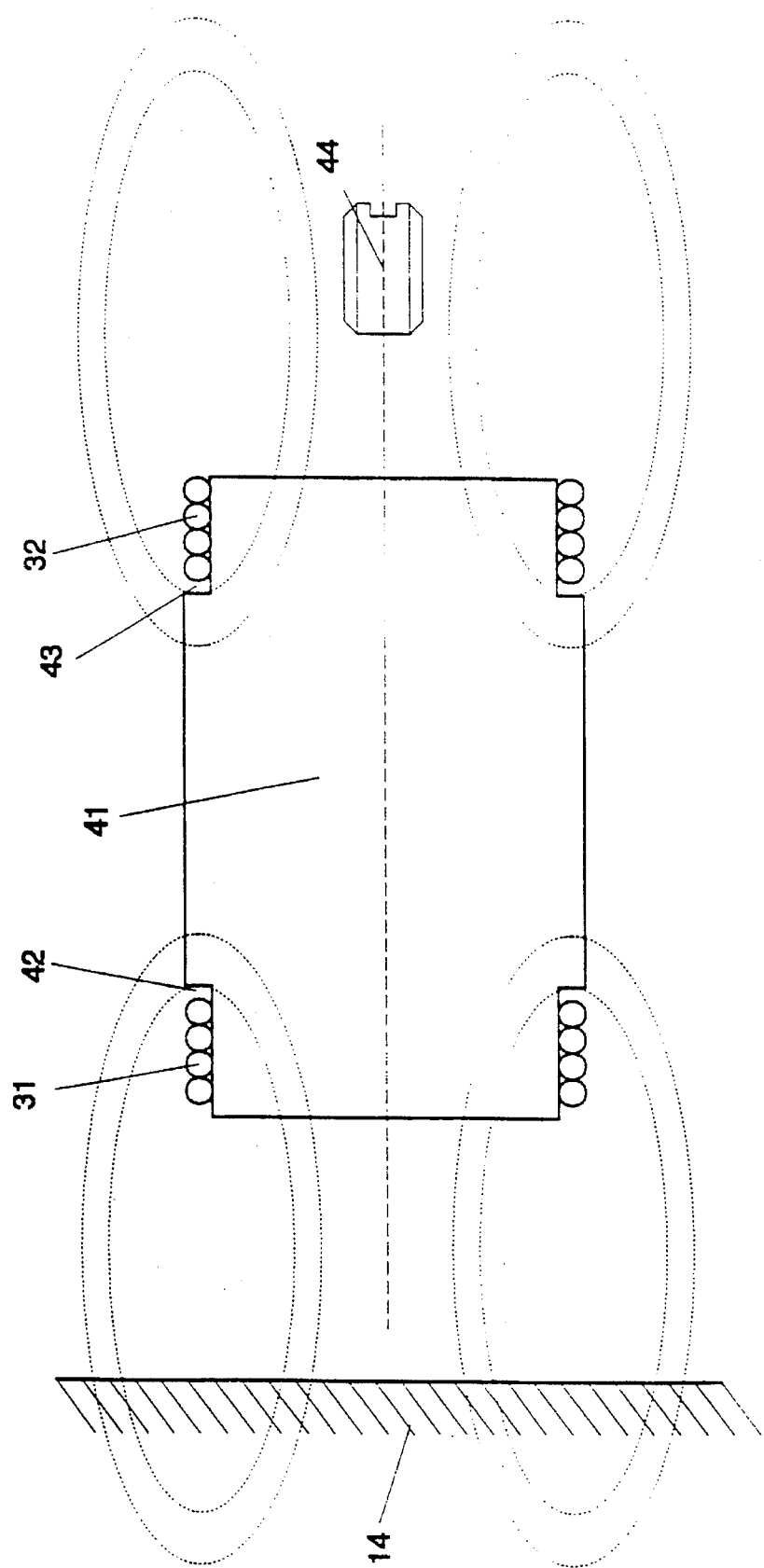
Figure 10:
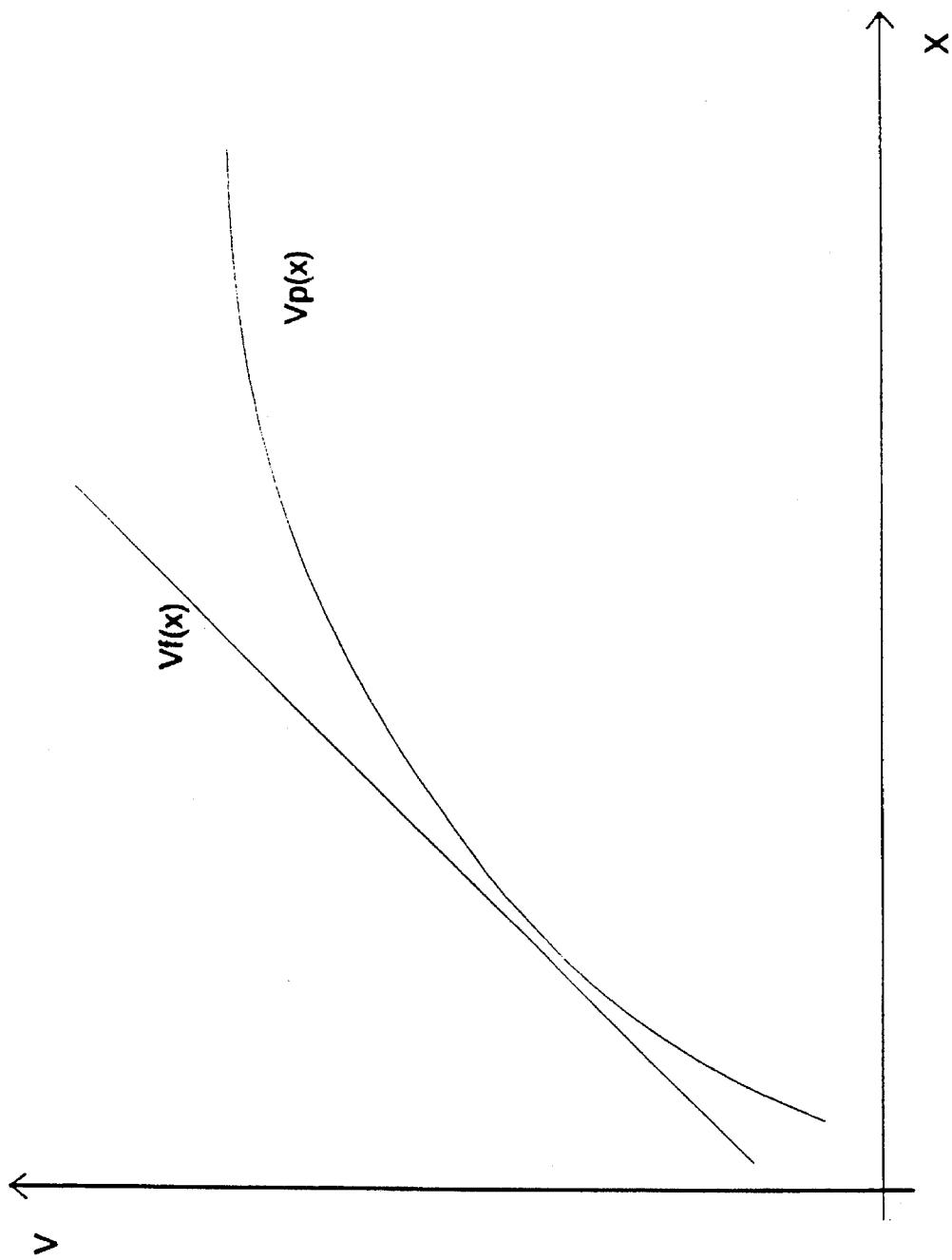
Figure 11:
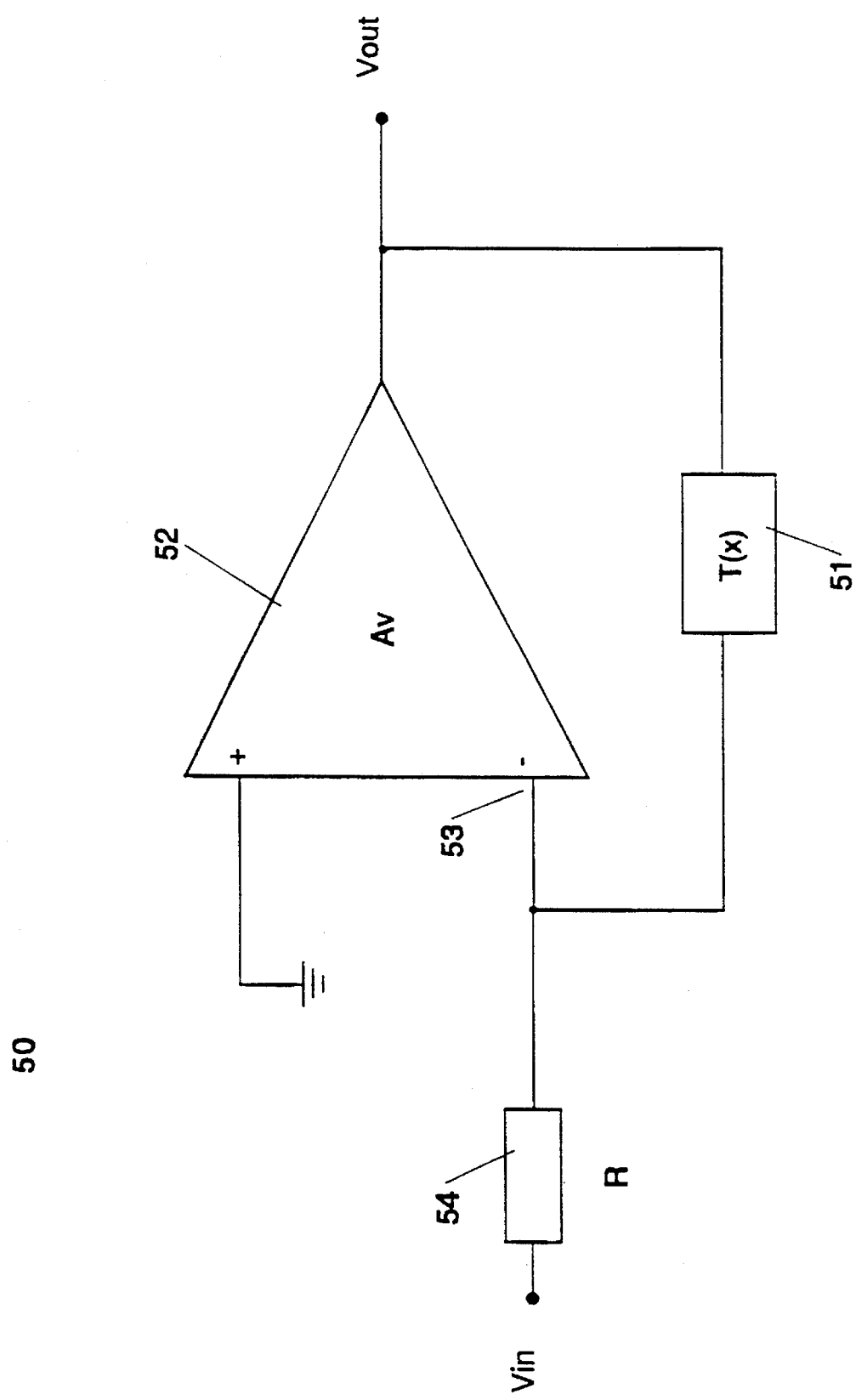
Figure 12:
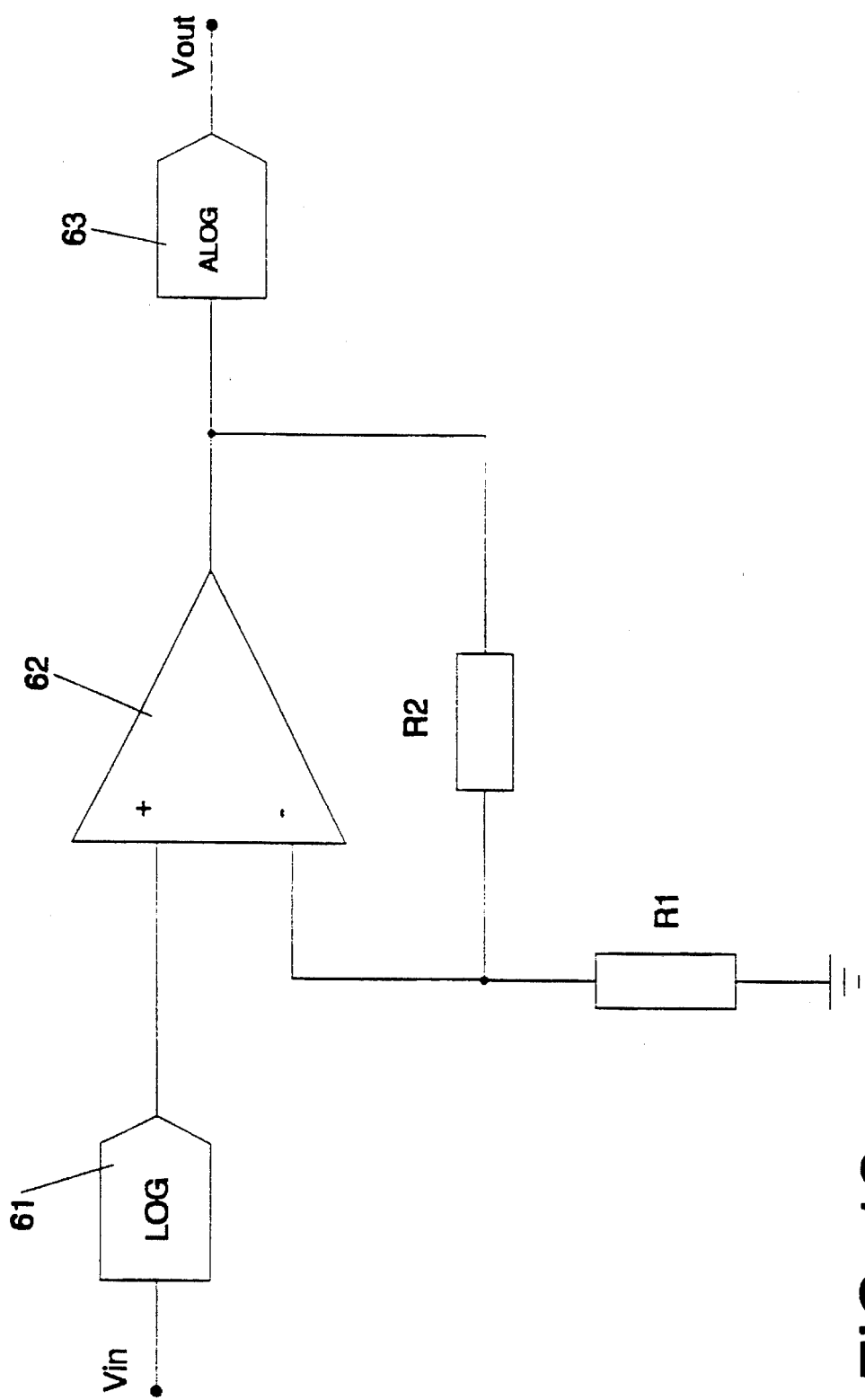
Figure 13:
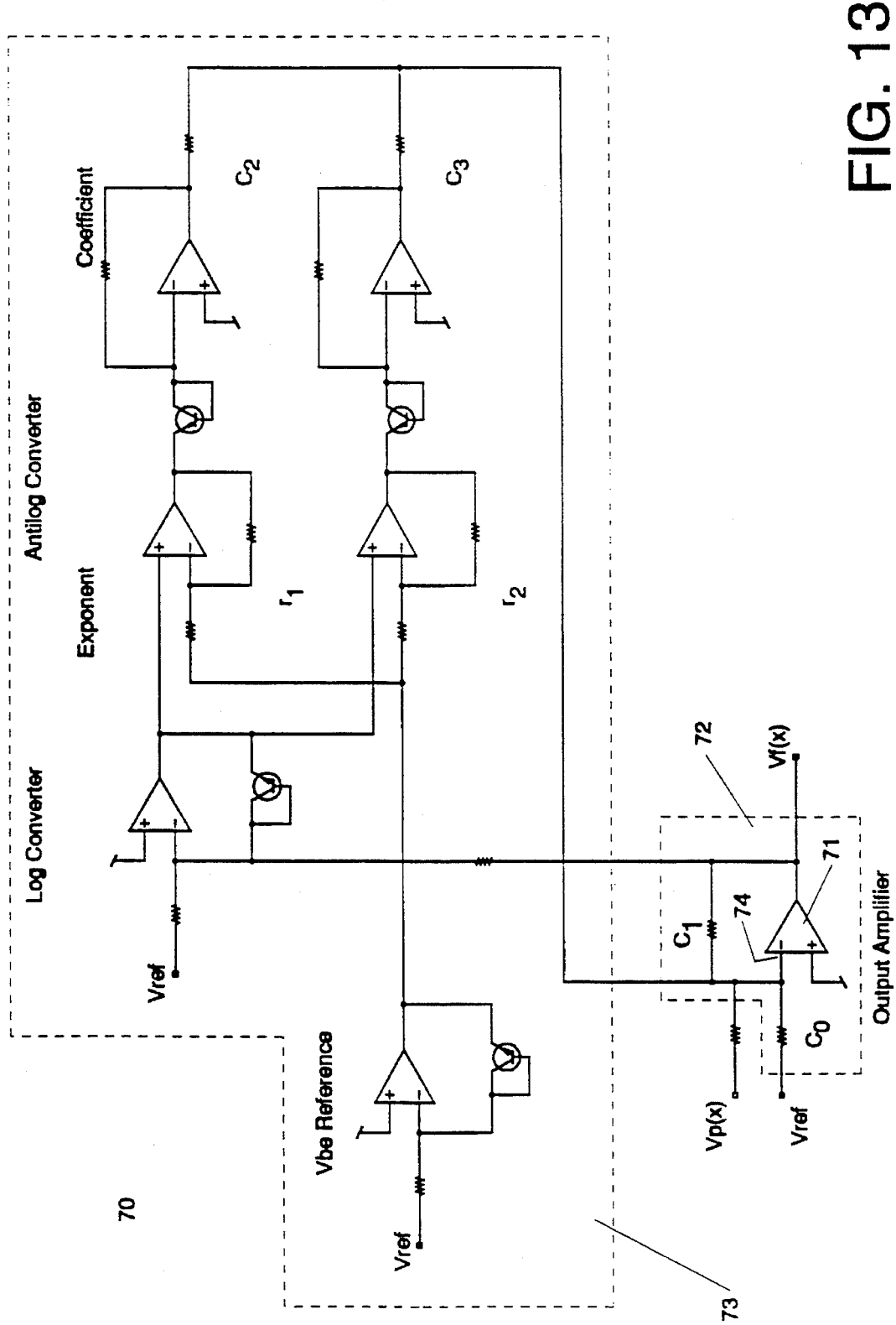

The invention will now be further described with reference to the drawings, in which FIG. 1 illustrates a block diagram of a displacement transducer, FIG. 2 illustrates the principle of impedance projection provided by the invention, FIG. 3 illustrates the principle of voltage projection according to a preferred embodiment of the invention, FIG. 4 is a block diagram showing a preferred embodiment of the system of the invention, FIG. 5 is a block diagram showing an alternative embodiment of the system of the invention, FIG. 6 illustrates the relative changes of the impedance or voltage of a measurement probe with a single coil, FIG. 7 is a schematic drawing of a measurement probe with two coils connected in a balanced circuit according to a preferred embodiment of the invention, FIG. 8 illustrates the relative changes of impedance or voltage of a balanced measurement probe as for example shown in FIG. 7, FIG. 9 is a sectional view of a balanced probe illustrating the arrangement of an adjustment core, FIG. 10 illustrates the non-linearity of a transducer output, FIG. 11 is a block diagram of a circuitry for linearizing the non-linear outputs of the systems of FIGS. 4 and 5, FIG. 12 is a block diagram of a circuitry for raising an input into an arbitrary power, and FIG. 13 is a diagram showing a preferred embodiment of a circuitry for linearizing the non-linear outputs of the systems of FIGS. 4 and 5.

FIG. 1 is a block diagram illustrating the principle of a displacement transducer system 10 of the present invention. The system comprises a probe or a transducer 11 in which a coil 12 is supplied with a high frequency ac signal and thereby generates an electromagnetic field illustrated by dotted lines in FIG. 1. The ac signal is supplied by an oscillator/demodulator 13 unit in which the processing of the probe or transducer output is also taking place. The mode of operation of the transducer 11 is based on changes in the electromagnetic field caused by eddy currents which are generated within the electrically conducting object of measurement 14 and the changes in the electromagnetic field are detected by measuring changes in the impedance of the coil 12. By using a detector system 10 as described in the following it is possible to compensate the effects of variation in the conductivity and the permeability of the object 14 which is being measured. When compensating for changes in the conductivity and the permeability, the effects of changes in the temperature of the object 14 being measured are also compensated for. Thus, by choosing a probe 11 configuration in which the effects of temperature changes are minimized as described in the following, the effects of temperature changes on the transducer system 10 as a whole are minimized. It is to be emphasized that the principles of the present invention are also valid for other probe 11 configurations than those comprising a coil 12. The probe or transducer 11 may for example be formed as a foil of an electrically conducting material or having any other convenient form.

The diagram of FIG. 2 illustrates the principle of impedance projection which is provided by the invention. This principle is based on the fact that it has been found by the inventors that the impedance vector $Z_s$ of the coil 12 in FIG. 1 may be represented as a sum of two impedances $$Z_s = Z_1 + \gamma Z_2, \tag{1}$$

where $Z_1$ is a vector which is a function of the parameters of the coil 12 (dimensions and electrical parameters) and the distance x between the coil 12 and the object 14, and $Z_2$ is a vector which is only a function of the parameters of the coil 12, while γ is a real number being a function of the parameters of the coil 12 and the parameters of the object of measurement 14 as well as being a function of the distance x between the coil 12 and the object 14. Thus, a unity vector in the direction of $Z_2$ will have a direction which is independent of the parameters of the object of measurement 14 and the distance x between the coil 12 and the object 14. It is therefore possible to perform a measurement of displacement which is independent of the material of the object of measurement 14 by having an Argand diagram in which the impedance $Z_s$ is projected onto an axis being perpendicular to the direction of $Z_2$. The resulting vector of this projection, $Z_p$, will represent a measure of the distance between the coil 12 and the object 14, and may thus be used for determining the relative displacement of the object 14.

In FIG. 2 the impedance $Z_s$ of the coil 12 is pictured in the Argand diagram as a function of the distance x between the coil 12 and the object 14 for four different materials of the object of measurement 14, and it is illustrated how the vector $Z_p$ resulting from the projection is independent of the material and thus the parameters of the object of measurement. By using the values of $Z_p$ when determining the displacement of the object 14, the effects of changes in the conductivity, the permeability and the temperature of the object of measurement 14 are minimized. However, it should be noted that since the vector $Z_1$ is a function of the parameters of the coil 12 or probe 11, the value of $Z_p$ will also be a function of these parameters besides being a function of the distance x.

According to the principle of projection illustrated in FIG. 2, the direction of $Z_2$ and $Z_p$ will only be a function of the parameters of the coil 12 or probe 11. Thus, the example illustrated in FIG. 2 is for one specific coil 12 or probe 11 configuration, while another probe 11 configuration may result in a different direction of the vector of projection $Z_p$, and it should be understood that the direction of $Z_2$ will be a constant specific to each probe 11. Thus, it is possible to determine the direction of $Z_2$ by performing a series of measurements of the impedance $Z_s$ for different materials of the object to be measured and for different values of the distance x. The values thus obtained of the impedance $Z_s$ may be pictured in a diagram as a function of the distance x as shown in FIG. 2, and by use of a graphical or numeric optimization, a set of parallel lines may be drawn for each value of the distance x through the measurement points of each curve, where these measurement points represent the values of the measured impedance $Z_s$. The direction of the parallel lines thus obtained is equal to the direction of $Z_2$.

When using a probe current $I_{osc}$ being generated from the voltage output of an oscillator $V_{osc}$, with $I_{osc}$ having the same phase as $V_{osc}$ and having a constant amplitude and frequency, then for simplicity the values of the impedances of the coil 12 may be substituted by the voltages across the output terminals of the coil 12 or the transducer 11, that is $Z_s$, $Z_1$, $Z_2$ and $Z_p$ are equivalent to $V_s$, $V_1$, $V_2$ and $V_p$. This is illustrated in FIG. 3 where measured values of the output voltage vector of the coil $V_s$ are shown in the Argand diagram for different materials as a function of the distance x.

In FIG. 3 the angle between the parallel lines giving the direction of $Z_2$ and the real voltage axis is shown as $\phi_1$. The angle of the axis of projection $\phi_r$ is thus given by $$\phi_r = \phi_1 + \pi/2 \quad (2)$$

and the angle of projection $\phi_p$ is given by $$\phi_p = \phi_r - \phi_s, \quad (3)$$

where $\phi_s$ is the angle between the real voltage axis and the output voltage vector $V_s$.

The direction of the axis of projection may be represented by a reference voltage vector $V_r$ which may be generated from $V_{osc}$. Thus, the vector $V_r$ has a constant amplitude, phase and frequency of oscillation when compared to $V_{osc}$. The projection of the voltage vector $V_s$ on the vector $V_r$ may be expressed by a projection vector $V_p$ as $$V_p = V_r(V_s \cdot V_r)/|V_r|^2 \quad (4)$$

which may be written as $$V_p = V_r(|V_s||V_r|\cos(\phi_p))/|V_r|^2. \quad (5)$$

As the amplitude, phase and frequency of $V_r$ are constants, it can be derived from equation (5) that the magnitude of $V_p$ is given by $$|V_p| = K_r|V_s|\cos(\phi_p) \quad (6)$$

where $K_r$ is a constant equal to $|V_r|$.

The result of equation (6) may be realized by multiplying the reference voltage vector $V_r$ with the coil output voltage vector $V_s$. If the voltages are sinusoidal with a frequency ω, then the real values of $V_r$ and $V_s$ may be written as a function of time t as $$V_r = A_r\cos(\omega t + \phi_r) \quad (7)$$

$$V_s = A_s\cos(\omega t + \phi_s)$$

where $A_r$ and $A_s$ are constants representing the amplitudes of the voltages.

By multiplying $V_r$ and $V_s$ a result $V_o$ can be obtained as $$V_o = \tfrac{1}{2}(A_rA_s)(\cos(2\omega t + \phi_r + \phi_s) + \cos(\phi_r - \phi_s)). \quad (8)$$

The frequency of the oscillator ω may be regarded as a carrier frequency being amplitude modulated by the movement of the object of measurement. The carrier frequency is several times larger than the modulating frequency of movement. From equation (8) it is seen that the expression for $V_o$ includes frequencies which are both sum and differences of ω, corresponding to a dc component and a component with the double frequency 2ω. By using a suitable low-pass filtering it is thus possible to remove the double frequency 2ω component and to maintain the dc component. A demodulated result $V_{odem}$ may thus be obtained given by $$\begin{aligned} V_{odem} &= 1/2(A_rA_s)\cos(\phi_r - \phi_s) \\ &= 1/2(A_rA_s)\cos(\phi_p). \end{aligned} \quad (9)$$

From the above equations it can be seen that equation (9) has the same form as equation (6), since the amplitude $A_r$ of the reference voltage $V_r$ is a constant, and thus the result of equation (9) may be used to represent the result of the projection, this result being a function of the amplitude $A_s$ of the coil or transducer output voltage $V_s$ and the angle of projection $\phi_p$.

A preferred embodiment of an electronic system for realization of the above described voltage projection in accordance with the transducer principle of this invention is shown in FIG. 4. Here an oscillator 21 is providing a sinusoidal output voltage $V_{osc}$ with a generally constant amplitude, phase and frequency. The output frequency may be in the range of 0.1–10 MHz, preferably around 1 MHz. A voltage to current converter 22 generates a probe current $I_{osc}$, with $I_{osc}$ having a constant amplitude and the same phase and frequency as $V_{osc}$. The probe current $I_{osc}$ is supplied to a measurement coil in the transducer 11 via current input terminals of the transducer, in which coil an electromagnetic field is established and thus creating eddy currents in the object of measurement 14. The output voltage of the measurement coil, which is equal to a transducer or probe output voltage $V_s$, is supplied from output terminals of the transducer 11 to an amplification unit 23 in which the probe voltage $V_s$ is amplified with an amplification factor of $A_v$, the obtained result $A_v V_s$ having the same phase as the input $V_s$ of the amplification unit 23. The system of FIG. 4 also comprises a phase shifting unit 24 in which the oscillator output voltage $V_{osc}$ or a voltage with a constant amplitude having the same frequency and phase as $V_{osc}$ is phase shifted with an angle equal to the angle of the axis of projection $\phi_r$, which is predetermined by a graphical or numeric optimization according to the previous description. The output of the phase shifting unit 24 is a reference voltage $V_r$ having a constant amplitude and the same frequency as the voltage $V_{osc}$ and a phase which is shifted by the angle $\phi_r$ when compared to the phase of the voltage $V_{osc}$. The outputs of the phase shifting unit 24 $V_r$ and the amplification unit 23 $A_v V_s$ are multiplied by use of a multiplying unit 25 resulting in an output voltage $$V_{os} = (A_v V_s) V_r \qquad (10)$$

having a component with the double frequency $2\omega$ of the voltage $V_{osc}$ and a dc component. By filtering the output of the multiplying unit by use of a low-pass filter 26 a demodulated dc output $V_{osdem}$ is obtained corresponding to the desired magnitude $|V_p|$ of the projection vector $V_p$.

An alternative embodiment of an electronic system for realization of the above described voltage projection in accordance with the transducer principle of this invention is shown in FIG. 5. The system of FIG. 5 is almost identical to the system of FIG. 4 but the voltage supplied to the phase shifting unit 24 is not a sinusoidal voltage like the oscillator output voltage $V_{osc}$. Instead a symmetrical square wave voltage signal $V_{sq}$ having a constant amplitude and the same frequency $\omega$ and phase as $V_{osc}$ is supplied to the phase shifting unit 24. Thus, a square wave reference voltage $V_{rsq}$ is obtained as an output from the phase shifting unit 24, where $V_{rsq}$ is phase shifted by the reference angle $\phi_r$ when compared to the voltage $V_{sq}$. By the use of Fourier analysis it can be shown that the output of the multiplication unit according to FIG. 5, $$V_{osq} = (A_v V_s) V_{rsq}, \qquad (11)$$

may be written as a sum of dc components and all even harmonic components of the oscillation frequency $\omega$, when the voltage $V_s$ is a sinusoidal voltage with the frequency $\omega$, i.e $V_s$ is the same voltage as in FIG. 4, and $V_{rsq}$ is a symmetrical square wave voltage with the same frequency $\omega$. By low-pass filtering the output $V_{osq}$, a demodulated output $V_{osqdem}$ is obtained, which may be written as a Fourier summation of dc components $$V_{osqdem} = A_v A_s \Sigma A_n \cos(\phi_p) \qquad (12)$$

where $A_v$ is the amplification factor of the amplifying unit 23, $A_s$ is the amplitude of $V_s$ and $A_n$ are Fourier coefficients of the square wave reference voltage $V_{rsq}$, where the summation is from n=1 to n going to infinity. As the summation of the Fourier coefficients $\Sigma A_n$ is a constant it can be seen that the result of equation (12) corresponds to the desired magnitude of the projection vector $|V_p|$, from equation (6).

When measuring changes in impedance of the measuring coil of a single coil transducer by measuring the transducer output voltage $V_s$ as described above, the magnitude of $V_s$ is several or many times larger than the change in the magnitude of $V_s$, $\Delta|V_s|$, which change corresponds to a change in the impedance of the coil as a result of a movement or displacement of the object of measurement in front of the measuring coil. This is illustrated in FIG. 6, where the voltage curves of FIG. 3 are shown in a more realistic scale. It may be seen from FIG. 6 that the changes in the impedance of the coil are relatively small when compared to the nominal impedance of the coil. As the principles of a preferred embodiment according to the invention comprise forwarding a probe current $I_{osc}$ of a constant amplitude through the measurement coil and measuring the voltage $V_s$ across the coil, it should be clear that any undesired change in the probe current $I_{osc}$, will result in an error voltage across the coil, this error voltage being proportional to the undesired change in the probe current. However, this error voltage may be very large when compared to the change $V_s$, $\Delta|V_s|$, resulting from the displacement of the object of measurement.

In order to overcome this effect of changes in the probe current $I_{osc}$, a preferred embodiment according to the invention uses a self-compensating transducer 30 as illustrated in FIG. 7. This self-compensating transducer 30 comprises a pair of similar or generally similar coils 31, 32, a measurement coil 31 and a reference coil 32 being connected in series, and a pair of impedances 33, 34 having substantially the same values and being connected in series, the values of the two impedances 33, 34 being much larger than the impedance values of the two coils 31, 32, the two coils 31, 32 and the two impedances 33, 34 forming part of a balanced or substantially balanced circuit, with a pair of output voltage terminals for measuring the output voltage $V_s$ being formed at the centre points of the series connected coils 31, 32 and the series connected impedances 33, 34, respectively, i.e. the two balancing points of the balanced circuit. A pair of current input terminals for supply of the probe current $I_{osc}$ are formed at the input of the reference coil 32 and the output of the measurement coil 31, respectively.

For the self-compensating transducer 30 shown in FIG. 7, a voltage change across the measurement coil 31 arising from a change in the magnitude of the probe current will be balanced by a similar voltage change across the reference coil 32. Furthermore, a voltage change arising from changes in the measurement coil 31 parameters with changes in temperature will also be balanced by a similar voltage change across the reference coil 32.

When using a self-compensating transducer configuration 30 as shown in FIG. 7 in the systems of FIGS. 4 and 5, the measured transducer output voltage $V_s$ will be balanced when no object 14 is in the vicinity of the coils 31, 32 of the self-compensating transducer 30, corresponding to the "infinity" distance point being at the point of origin in the Argand diagram as shown in FIG. 8.

In a preferred embodiment of the self-compensating transducer 30 according to FIG. 7, the two coils 31, 32 are wound on a common core 41, which may be a magnetic core, the two coils 31, 32 being arranged in corresponding recesses 42, 43 being formed at each end of the core 41 as shown in FIG. 9. The length of the two recesses 42, 43 may be different, as illustrated in FIG. 9, where the length of the recess 42 of the measurement coil is longer than the length of the recess 43 of the reference coil. When using this arrangement of different recess length it is possible to adjust or trim the coil having the shortest recess by using an adjustment or trim core 44 in order to obtain balance in the circuit. This is also illustrated in FIG. 9 where a trim core 44 is shown in the near vicinity of the reference coil 32 so that the trim core 44 may influence the resulting electromagnetic field of the reference coil 32 in order to obtain balance in the bridge or "balanced" circuit. The trim core or adjustment member 44 may be produced from an electrically conducting material and/or a magnetizable material.

In a preferred embodiment, a transducer configuration is chosen which is working outside a resonant mode of operation (in a resonant mode of operation there is a resonance between the self-induction of the coils 31, 32 and the capacity across the coils). Thus, the impedances of the transducer coils 31, 32 must be chosen to have relative low values in order to secure that the system is working out of resonance mode, and to secure that changes in the capacity of the cables due to for example changes in temperature will only have a minor influence on the transducer function. By having a low impedance of the coils 31, 32, it is necessary to supply the transducer with a relatively high probe current $I_{osc}$ in order to obtain a high output voltage $V_s$ from the transducer.

For the coils 31, 32 used in the above described transducers, it is preferred that the coils 31, 32 are made of materials having small variations in material parameters as a function of temperature.

The system outputs of FIGS. 4 and 5, $V_{osdem}$ and $V_{osqdem}$, corresponding to the magnitude of the projection vector $|V_p|$, are functions of changes in the distance x between the transducer 11 measurement coil 12, 31 and the object of measurement 14, and thus providing the desired transducer system output as a function of changes in the distance x as described in the previous sections. However, these system outputs are not linear. This is due to the fact that the transducer output voltage $V_s$ does not vary linearly as a function of changes in the distance x between the measurement coil 12, 31 and the object 14, as illustrated in FIG. 10, where the magnitude of the projection vector $|V_p|$ is shown and compared to a desired linear transducer output voltage $V_f$ as a function of the distance x.

As a final transducer system output voltage $V_f$ should be a linear function of changes in the distance x between the coil 12, 32 and the object of measurement 14, it is thus necessary to linearize the system output according to the system of FIGS. 4 or 5.

An exact linearization may be obtained by multiplying the system output voltage with a reciprocal function of the system output as a function of the distance x. The system output may be expressed as a polynomial function of an order of n, T(x), obtained by the method of least squares. T(x) may be written as $$T(x) = c_0 + c_1(x) + c_2(x)^2 + c_3(x)^3 + \ldots + c_n(x)^n \quad (13)$$

where $c_n$ is a real number and n is a positive integer.

The polynomial function T(x) may be stored in an electronic memory from which the values of T(x) or 1/T(x) may be obtained in order to perform a linearization of the system output voltage.

In order to obtain an electrical implementation of the reciprocal function 1/T(x), the polynomial function T(x) may be placed in a feed back loop 51 of an operational amplifier 52 as shown in the linearization circuit diagram 50 of FIG. 11. In the diagram of FIG. 11 a non-linear voltage signal $V_{in}$ is supplying an input current to the $V_{-}$ input 53 of the operational amplifier 52 through the resistor R 54, while a polynomial function T(x) of the non-linear voltage signal is placed in the feed back loop 51 of the amplifier 52. The output of the operational amplifier $V_{out}$ will be linearized with respect to x as the operational amplifier controls $V_{out}$ so that the current supplied by $V_{out}$ to the summation point at the $V_{-}$ input 53 is equal to and oppositely directed to the input current generated by $V_{in}$, corresponding to multiplying the non-linear signal $V_{in}$ with the reciprocal transducer function 1/T(x).

In practice it is not convenient to realize an electrical implementation of a polynomial function T(x) of an arbitrary high order of n, and usually the smallest possible value is chosen for n, and from experience a reasonable good linearization may be obtained by using a polynomial function T(x) with n having an order of four.

The difficult part in generating the polynomial function T(x) is raising x into a power of n. This raising of x may be performed by using a series of multiplying units or by using electronic units performing logarithmic and/or antilogarithmic functions. By using logarithmic and anti-logarithmic functions the following equation can be derived $$\begin{aligned}(x)^n &= A\log(\log((x)^n)) \\ &= A\log(n\log(x)).\end{aligned} \quad (14)$$

By the use of equation (14) the values of n are not restricted to positive integers only as the value of n may be any real number, including positive fractional numbers. A block diagram for raising an input voltage signal into an arbitrary power is shown in FIG. 12 where the input signal $V_{in}$ is led to a logarithmic unit 61, the output of which is multiplied with (1+ (R2/R1)) by an operational amplifier 62 with a feed back loop, and the output of the operational amplifier being processed by an anti-logarithmic unit 63 resulting in an output voltage $V_{out}$. For the diagram of FIG. 12 the relation between the output and the input voltage is given by $$V_{out} = V_{in}^r \quad (15)$$

where the value of r is given by $$r = 1 + (R2/R1). \quad (16)$$

The electrical implementation of the logarithmic and anti-logarithmic units 61, 63 of FIG. 12 may be carried out by using transistors, utilizing the exponential relation between the collector current $I_c$ and the base-emitter voltage $V_{be}$ of a transistor. This exponential relation can also be expressed by using the natural logarithm as $$V_{be} = (KT/q)\ln(I_c/I_{es}) \quad (17)$$

where q is the charge of an electron, K is the constant of Boltzmann, T is the absolute temperature in degrees Kelvin, and $I_{es}$ is a characteristic emitter leakage current of the transistor. The value of $\ln(I_c/I_{es})$ is a strong function of the temperature of the transistor and with great variation from one transistor to another, when comparing discrete transistors. However, it is possible to manufacture four almost identical transistors on the same substrate of an integrated circuit, whereby the obtained values of $I_{es}$ for these four transistors are almost the same and whereby a nearly identical operating temperature is secured for these four transistors.

With four almost identical transistors it is possible to generate a polynomial function T(x) according to equation (13) of an order of three. However, this is not sufficient to fulfill the required linearity of the transducer system output but it has been found that a polynomial function T'(x) using real numbers with an order of three may result in almost the same linearity as can be obtained from a polynomial function T(x) using positive integers with an order of four. Thus, T'(x) can be written as $$T'(x) = c_0 + c_1(x) + c_2(x)^{r1} + c_3(x)^{r2} \qquad (18)$$

where $c_n$, r1, and r2 are real numbers.

The function of T'(x) in equation (18) may be realized by using four matched transistors which are prepared on the same substrate as described above.

FIG. 13 shows a diagram of a preferred embodiment of an electronic circuitry 70 for linearizing a non-linear electrical signal by using the polynomial function of equation (18). In the circuit of FIG. 13 it is possible to adjust the coefficients $c_0$–$c_3$ and the exponents r1, r2 independently by choosing appropriate resistor values.

The linearization circuit 70 of FIG. 13 comprises an operational amplifier 71 having two feed back loops 72, 73, an active loop 73 and a passive loop 72. The passive loop 72 corresponds to the $c_0 + c_1(x)$ part of equation (18) while the active loop 73 corresponds to the $c_2(x)^{r1} + C_3(x)^{r2}$ part of this equation. The current from the two loops 72, 73 are summed at the minus input V_ 74 of the amplifier 71. As the input voltage $V_{in}(x)$ is a non-linear voltage, the current supplied by the input voltage to the summation point V_ 74 of the amplifier 71 is a non-linear current. This non-linear current is balanced by an oppositely directed current supplied through the passive (linear) and the active (non-linear) feed back loops 72, 73, so that the feed back loops 72, 73 may be regarded as a non-linear impedance.

It should be understood that although the invention has been shown and described with respect to preferred embodiments thereof, various other variations and additions thereto may be made therein without departing from the spirit and scope of the present invention. Thus, other embodiments which may comprise computers for processing of the relevant signals are part of the invention.

We claim:

1. A method for determining a displacement of an object of an electrically conductive material, said method comprising establishing, by means of a transducer having transducer terminals and being placed adjacent to and spaced from the object, an electromagnetic field creating eddy currents in the object, providing a first electrical signal which represents the impedance of the transducer and which may be represented by a first vector having a direction and a magnitude corresponding to those of the electrical signal, and having first and second components, the first component being a second vector dependent on the characteristics of the transducer and on the distance between the transducer and the object, and the second component being a product of a first factor which is a real number and a second factor which is a third vector, the first factor depending on the characteristics of the transducer, the distance between the transducer and the object, and characteristics of the object, the third vector depending substantially on characteristics of the transducer, and processing the first electrical signal represented by the first vector, said processing including projecting the first vector onto an axis being generally at right angles to the third vector, said projecting generating a second electrical signal corresponding to a fourth vector representing the displacement of the object and being substantially independent of the characteristics of the object.

2. A method according to claim 1, wherein the direction of the second component is found by a graphical or numeric optimization of a plurality of curves representing values of the first electrical signal as a function of the distance between the transducer and the object, the plurality of curves representing a plurality of conducting materials of the object.

3. A method according to claim 1, wherein said processing further comprises multiplying or dividing the first electrical signal with the second electrical signal.

4. A method according to claim 3, wherein said processing further comprises filtering the result of the multiplication or division, the filtering preferably being a low-pass filtering.

5. A method according to claim 4, wherein said processing further comprises linearizing the result of the filtering.

6. A method according to claim 1, wherein an input current generated from an oscillator output voltage and having a substantially constant amplitude and frequency and a phase substantially equal to the phase of the oscillator output voltage is supplied to the transducer.

7. A method according to claim 1, wherein the first electrical signal is the voltage across a pair of terminals of the transducer.

8. A method according to claim 6, wherein the second electrical signal is generated by providing the oscillator output voltage with a phase shift.

9. A method according to claim 8, wherein the angle of the phase shift equals the angle between the oscillator output voltage and a vector being at substantially right angles to the second component of the first electrical signal.

10. A method according to claim 1, wherein the transducer comprises a coiled wire made from a material having a conductivity and other electrical characteristics which is temperature dependent to a small degree only.

11. A method according to claim 1, wherein the transducer is self-compensating and comprises a pair of coils and a pair of impedances being part of a bridge network.

12. A method according to claim 11, wherein the coils are arranged around a common magnetic core.

13. A method according to claim 11, wherein an electric value of the coils differs slightly, said electric value of at least one of the coils being adjusted by adjustment means so as to obtain substantially the same electric value for said pair of coils.

14. A method according to claim 13, wherein the adjustment means comprises an adjustment member which is made from an electrically conducting material and/or a magnetizable material and which is moveable in relation to the coils.

15. A method according to claim 5, wherein the linearization comprises approximating the result of the filtering to a first polynomial function with positive integral exponents of at least an order of four.

16. A method according to claim 15, wherein the polynomial function is used in a feed back loop of a circuit comprising an amplifier.

17. A method according to claim 5, wherein the linearization comprises approximating the result of the filtering to a second polynomial function with positive broken exponents of at least an order of two.

18. A method according to claim 16, wherein the second polynomial function has positive broken exponents of at least an order of three.

19. A method according to claim 17, wherein the polynomial function is used in a feed back loop of a circuit comprising an amplifier.

20. A method according to claim 17, wherein the polynomial function is generated by use of transistors being integrated on a common substrate of an integrated circuit.

21. An apparatus for determining a displacement of an object of an electrically conductive material, said apparatus comprising a transducer for establishing an electromagnetic field creating eddy currents in the object when the transducer is placed adjacent to and spaced from the object, said transducer having transducer terminals, means for providing a first electrical signal which represents the impedance of the transducer and which may be represented by a first vector having a direction and a magnitude corresponding to those of the electrical signal and having first and second components, the first component being a second vector dependent on the characteristics of the transducer and on the distance between the transducer and the object, and the second component being a product of a first factor which is a real number and a second factor which is a third vector, the first factor depending on the characteristics of the transducer, the distance between the transducer and the object, and characteristics of the object, the third vector depending substantially on the characteristics of the transducer, and means for processing the first electrical signal represented by the first vector, said processing including projecting the first vector onto an axis being generally at right angles to the third vector, said projecting generating a second electrical signal corresponding to a fourth vector representing the displacement of the object and being substantially independent of the characteristics of the object.

22. An apparatus according to claim 21, wherein said processing means further comprises means for generating the second electrical signal corresponding to the fourth vector being at substantially right angles to the second component which second electrical signal represents the axis of projection, and means for multiplying or dividing the first electrical signal with the generated second electrical signal.

23. An apparatus according to claim 21, further comprising means for filtering the output of the multiplication or division means, the filtering means preferably being means for low-pass filtering.

24. An apparatus according to claim 23, further comprising means for linearizing the output of the filtering means.

25. An apparatus according to claim 21, wherein the means for providing a first electrical signal further comprises oscillator means for generating an oscillator output voltage, means for generating an input current to the transducer, said input current having a substantially constant amplitude and frequency and a phase substantially equal to the phase of the oscillator output voltage.

26. An apparatus according to claim 25, wherein the oscillator means is capable of generating an output voltage of a substantially constant frequency.

27. An apparatus according to claim 26, wherein the frequency is in the range of 0.1–10 MHz.

28. An apparatus according to claim 21, said processing means further comprising amplification means for amplifying the first electrical signal, said first electrical signal preferably being the voltage across the transducer terminals.

29. An apparatus according to claim 25, said processing means for generating the second electrical signal further comprising phase shifting means for providing the oscillator output voltage with a phase shift and thereby obtaining the second electrical signal, said phase shifting means preferably providing a phase shifting angle being equal to the angle between the oscillator output voltage and a vector being at substantially right angles to the second component of the first electrical signal.

30. An apparatus according to claim 21, wherein the transducer comprises a coil, which is preferably made of a material having small variations in material parameters as a function of temperature.

31. An apparatus according to claim 21, wherein the transducer is a self-compensating transducer comprising input and output current terminals, a pair of generally similar coils, a measurement coil and a reference coil, a pair of impedances having substantially the same values, the two coils and the two impedances forming part of a balanced circuit, with a pair of output voltage terminals being formed at the two balancing points of the balanced circuit.

32. An apparatus according to claim 31, wherein the transducer further comprises two cores or a common core for winding of the two coils and an adjustment core for balancing the balanced circuit, the two cores or the common core preferably having recesses of different length wherein the two coils are arranged.

33. An apparatus according to claim 31, wherein the coils are made of materials having small variations in material parameters as a function of temperature.

34. An apparatus according to claim 24, wherein the linearization means comprises means for approximating the output of the filtering means to a first polynomial function with positive integral exponents of at least an order of four, and circuit means comprising a feed back loop and using the first polynomial function in the feed back loop.

35. A method for determining a displacement of an object of an electrically conductive material, said method comprising establishing, by means of a transducer having transducer terminals and being placed adjacent to and spaced from the object, an electromagnetic field creating eddy currents in the object, providing a first electrical signal which represents the impedance of the transducer and which may be represented by a first vector $Z_s$ having a direction and a magnitude of that of the electrical signal and being expressed by the equation:

$$Z_s = Z_1 + \gamma Z_2$$

wherein $Z_1$ is a vector dependent on the characteristics of the transducer and on the distance between the transducer and the object; $\gamma$ is a real number dependent on the characteristics of the transducer, the distance between the transducer and the object, and the electrical conductivity of the object; and $Z_2$ is a third vector dependent substantially on the characteristics of the transducer; and processing the first electrical signal represented by $Z_s$, said processing including projecting $Z_s$ onto an axis being generally at right angles to $Z_2$, said projecting generating a fourth vector $Z_p$ representing the displacement of the object and being substantially independent of the characteristics of the object.

* * * * *